(12) United States Patent
Murashige et al.

(10) Patent No.: US 8,800,346 B2
(45) Date of Patent: Aug. 12, 2014

(54) WIND TUNNEL BALANCE CALIBRATOR

(75) Inventors: Atsushi Murashige, Kakamigahara (JP);
Yoshihiro Hamada, Ichinomiya (JP);
Takeo Kawamura, Kakamigahara (JP);
Toshiyuki Kimura, Motosu (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 431 days.

(21) Appl. No.: 13/378,463

(22) PCT Filed: Jun. 21, 2010

(86) PCT No.: PCT/JP2010/004115
§ 371 (c)(1),
(2), (4) Date: Jan. 17, 2012

(87) PCT Pub. No.: WO2010/150506
PCT Pub. Date: Dec. 29, 2010

(65) Prior Publication Data
US 2012/0111088 A1    May 10, 2012

(30) Foreign Application Priority Data
Jun. 22, 2009   (JP) ................. 2009-148062

(51) Int. Cl.
*G08B 29/20*   (2006.01)
*G01M 9/06*   (2006.01)
(52) U.S. Cl.
CPC ................... *G01M 9/062* (2013.01)
USPC ........................................................ 73/1.15
(58) Field of Classification Search
None
See application file for complete search history.

(56) References Cited

U.S. PATENT DOCUMENTS 5,279,144 A * 1/1994 Levkowitch .................. 73/1.15
6,629,446 B2 * 10/2003 Parker .......................... 73/1.15

FOREIGN PATENT DOCUMENTS

| JP | A-7-55633 | 3/1995 |
| JP | A-9-105706 | 4/1997 |
| JP | B2-3298343 | 7/2002 |
| JP | A-2002-243579 | 8/2002 |

OTHER PUBLICATIONS

Partial Translation of Ochi, "Measurement System of Aerodynamic Characteristics on the Wings by Means of the Balances," *Memoirs of Nishinippon Institute of Technology*, 2006, vol. 36, pp. 11-18.
Ochi, "Measurement System of Aerodynamic Characteristics on the Wings by Means of the Balances," *Memoirs of Nishinippon Institute of Technology*, 2006, vol. 36, pp. 11-18 (with abstract).
International Search Report dated Aug. 31, 2010 issued in International Patent Application No. PCT/JP2010/004115 (with translation).

* cited by examiner

*Primary Examiner* — Robert R Raevis
(74) *Attorney, Agent, or Firm* — Oliff PLC

(57) ABSTRACT

Provided are a wind tunnel balance calibrator capable of improving accuracy of attitude control of a wind tunnel balance, and a wind tunnel balance calibrator which can ensure a wide work space around the wind tunnel balance. A wind tunnel balance calibrator includes a load application mechanism for applying a load to a wind tunnel balance and an attitude restoration mechanism for restoring an attitude of the wind tunnel balance. The attitude restoration mechanism is constituted by a parallel-link mechanism including a support plate for supporting the wind tunnel balance, and actuators capable of displacing the attitude of the support plate with six degrees of freedom.

10 Claims, 11 Drawing Sheets

WIND TUNNEL BALANCE CALIBRATOR

TECHNICAL FIELD

The present invention relates to a wind tunnel balance calibrator for calibrating a balance used in a wind tunnel experiment of an airplane model, for example.

BACKGROUND ART

Conventionally, a wind tunnel experiment is conducted to measure forces and moments generated in an airplane model by applying a wind pressure to the airplane model. In this case, the airplane model is attached with a wind tunnel balance for measuring the forces and the moments. In general, the wind tunnel balance is provided with a plurality of strain gauges. These strain gauges detect a relationship between external forces applied actually to the airplane model and the resulting forces or moments in the wind tunnel experiment.

However, a strain (hereinafter referred to as "interference strain") occurs in a direction different from the direction in which the external force is applied actually to the airplane model, and this is detected by the strain gauge. Therefore, in the wind tunnel balance, it is necessary to preliminarily detect the interference strain occurring in the direction different from the direction in which the external force is applied actually to the airplane model and to calibrate a measurement result obtained in the wind tunnel experiment. For this purpose, i.e., to measure the relationship between the actual external force and the interference strain, a wind tunnel balance calibrator is used.

For example, Patent Literature 1 discloses a wind tunnel balance calibrator. According to this wind tunnel balance calibrator, the wind tunnel balance is inserted into a calibration body, and a number of load jacks are coupled to the calibration body so as to surround the calibration body. The calibration body is supported on frames surrounding the calibration body via a sting. A number of restoration jacks are coupled to the frames. In addition, to couple the load jacks externally placed outside the frames and the calibration body placed inside the frames to each other, the frames are provided with through-holes through which wires for coupling them together are inserted.

In the wind tunnel balance calibrator disclosed in Patent Literature 1, when the load jacks are actuated, a load (calibration load) is applied to the wind tunnel balance with six degrees of freedom via the calibration body. In this case, since the wind tunnel balance (or calibration body) itself strains, a relative attitude (position) between a load vector and the calibration body is displaced in the vicinity of an action point (application point). By actuating the restoration jacks, the attitude is restored. In this way, by maintaining the relative attitude (position) between the load vector and the calibration body with predetermined accuracy, it is possible to apply a desired calibration load correctly to the wind tunnel balance. By measuring a strain (including interference strain) generated in the wind tunnel balance under this condition, it is possible to correctly measure the relationship between the load and the interference strain.

In general, a method of measuring the strain while restoring the attitude displacement of the calibration body caused by application of the calibration load is referred to as a repositioning method, and is one of methods for use as the wind tunnel balance calibrator.

CITATION LISTS

Patent Literature

Patent Literature 1: U.S. Pat. No. 3,298,343

SUMMARY OF THE INVENTION

Technical Problem

However, in the wind tunnel balance calibrator disclosed in Patent Literature 1, the forces are applied via the large-sized frames surrounding the calibration body, from the restoration jacks to the wind tunnel balance in locations distant from a portion where a sting and the large-sized frames are coupled together. Therefore, a strain of the frames must be taken into account when the attitude of the wind tunnel balance is restored. Thus, it is difficult to improve accuracy of attitude control.

In addition to the load jacks, the frames and the restoration jacks are provided over the entire periphery of the wind tunnel balance. There is only a narrow space in the vicinity of the wind tunnel balance, which makes it difficult for an operator to work easily. Since the attitude of the wind tunnel balance is displaced with six degrees of freedom, the restoration jacks must displace the wind tunnel balance with six degrees of freedom to restore the attitude of the wind tunnel balance. Because of this, a number of restoration jacks are provided around the wind tunnel balance, which further lessens a work space.

Accordingly, an object of the present invention is to provide a wind tunnel balance calibrator capable of executing attitude control with higher accuracy. Another object of the present invention is to provide a wind tunnel balance calibrator which can ensure a wide work space around the wind tunnel balance.

Solution to Problem

A wind tunnel balance calibrator of the present invention, for measuring a strain of a wind tunnel balance which is generated by a load applied to the wind tunnel balance, comprises a load application mechanism for applying the load to the wind tunnel balance; and an attitude restoration mechanism for restoring an attitude of the wind tunnel balance which is displaced by the load applied to the wind tunnel balance; wherein the attitude restoration mechanism is a parallel-link mechanism including: a support unit for supporting the wind tunnel balance; and a driving unit which is configured to displace the attitude of the support unit with six degrees of freedom in directions of three orthogonal axes and around the three orthogonal axes, the driving unit including a plurality of linear actuators.

In such a configuration, the attitude of the wind tunnel balance can be controlled with high accuracy. The parallel-link mechanism can originally implement attitude control with six degrees of freedom with high accuracy. When the parallel-link mechanism is used as the attitude restoration mechanism of the wind tunnel balance calibrator, high-accuracy attitude control is achieved, and a high stiffness can be achieved without considering a strain of the frames, differently from the configuration disclosed in Patent Literature 1. Therefore, the attitude of the wind tunnel balance can be controlled and maintained with high accuracy in calibration of the wind tunnel balance in which a great load of several tons is applied to the wind tunnel balance.

The attitude restoration mechanism may support the wind tunnel balance at one side of the support unit; and the driving unit may be provided at an opposite side of the support unit. In such a configuration, since the driving unit of the attitude restoration mechanism is disposed not to surround the periphery of the wind tunnel balance, a wide space can be ensured around the wind tunnel balance.

The load application mechanism may include a plurality of actuators disposed around the wind tunnel balance to apply a load to the wind tunnel balance; and wherein the plurality of actuators may include moment actuators which are arranged in a predetermined area so as to form a sparse space in an area other than the predetermined area around the wind tunnel balance, the moment actuators being configured to generate moments around the orthogonal axes crossing each other within the wind tunnel balance. Since the moment actuators for applying the load are arranged in the predetermined area, a work space can be ensured in the area other than the predetermined area.

The load application mechanism may include buffering mechanisms for buffering the load applied by the actuators to the wind tunnel balance. In such a configuration, since the wind tunnel balance becomes insensitive to the load applied by the actuators, it is possible to prevent an excess load from being applied to the wind tunnel balance. In addition, the operation of the load application mechanism can be controlled easily when the load is applied to the wind tunnel balance.

The wind tunnel balance calibrator may further comprise weight cancel mechanisms for applying external forces for cancelling weights of the actuators, to the actuators in the load application mechanism, respectively. In such a configuration, calibration can be carried out with high accuracy while eliminating an influence of the weights of the actuators on the wind tunnel balance.

The wind tunnel balance calibrator may comprise a control unit for controlling operation of the load application mechanism and operation of the attitude restoration mechanism; wherein the control unit may be configured to stop the load application mechanism and the attitude restoration mechanism if a predetermined load is generated in an actuator which is not a controlled target in a state where the load is being applied to the wind tunnel balance.

The wind tunnel balance calibrator may comprise a control unit for controlling operation of the load application mechanism and operation of the attitude restoration mechanism; wherein the control unit is configured to change the load gradually while restoring the attitude of the wind tunnel balance, from when the load application mechanism starts to apply the load to the wind tunnel balance until a target value of the load is reached. In such a configuration, since the attitude of the wind tunnel balance having been displaced with a small amount is restored, interference from outside components can be suppressed when the attitude is being restored. For example, if attempt is made to restore the attitude of the wind tunnel balance having been displaced with a great amount, frictions of the components and changes in the actuators are great when the attitude is being restored. And, if the wind tunnel balance calibrator includes the weight cancel mechanisms, the weight cancel mechanisms change greatly according to the changes in the actuators. Because of this, the wind tunnel balance is affected by interferences from components of the wind tunnel balance calibrator. In contrast, if the attitude of the wind tunnel balance having been displaced with a small amount is restored as described above, the interference on the wind tunnel balance affected from the components of the calibrator is lessened. Therefore, calibration can be carried out with high accuracy.

The control unit may be configured to stop the load application mechanism and the attitude restoration mechanism, when the attitude of the wind tunnel balance is displaced with a predetermined amount or greater.

The wind tunnel balance calibrator may comprise an attitude detecting sensor for detecting the attitude of the wind tunnel balance; wherein the attitude detecting sensor and the load application mechanism may be supported independently of each other by different support mechanisms. In such a configuration, the influence of the operation of the load application mechanism on detecting accuracy of the attitude detecting sensor can be suppressed.

A method of operating the wind tunnel balance calibrator of the present invention, comprise the steps of: applying a load to the wind tunnel balance such that the load is changed by a predetermined value; restoring the attitude of the wind tunnel balance to a predetermined attitude after the load is changed by the predetermined value; and repeating the step of applying the load and the step of restoring the attitude to cause the load to reach a preset target value.

Advantageous Effects of the Invention

In accordance with the present invention, it is possible to provide a wind tunnel balance calibrator which can implement attitude control of a wind tunnel balance with higher accuracy, and can ensure a wide work space around the wind tunnel balance.

BRIEF DESCRIPTION OF THE DRAWINGS

FIG. 7 is a view showing a configuration of the actuator and a buffering mechanism, in which

DESCRIPTION OF THE EMBODIMENTS

Figure 1:
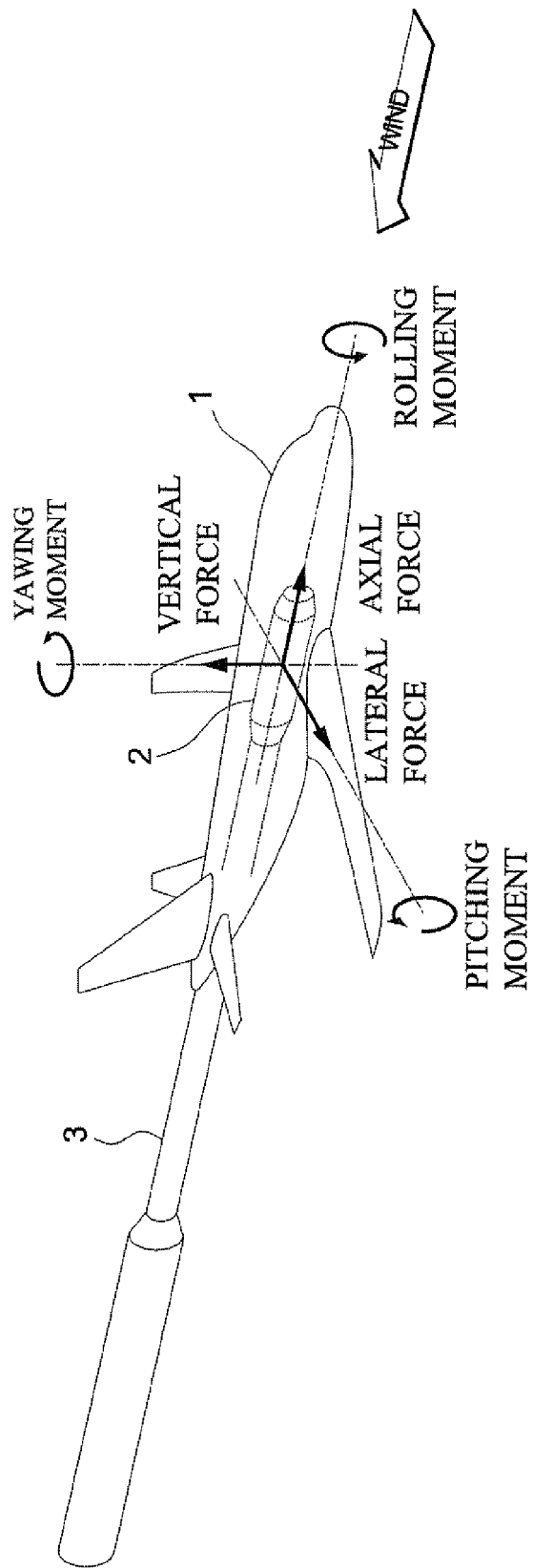
FIG. 1 is a schematic view showing a configuration of a wind tunnel experiment of an airplane model using a wind tunnel balance.

Hereinafter, a wind tunnel balance calibrator according to an embodiment of the present invention will be described with reference to the drawings. FIG. 1 is a schematic view showing a configuration of a wind tunnel experiment of an airplane model using a wind tunnel balance. As shown in FIG. 1, in the wind tunnel experiment relating to airplane, a wind tunnel balance 2 of a substantially cylindrical shape is inserted into and fixed in a predetermined location of an airplane model 1 created by scaling down the outer shape of actual airplane, and the wind tunnel balance 2 is supported in a predetermined position of a wind tunnel (not shown) via a sting 3. In this state, when wind is blown into the wind tunnel, forces and moments generated in the airplane model 1 due to a wind pressure are detected by a plurality of strain gauges (not shown) attached on the surface of the wind tunnel balance 2. The detected forces include an axial force in a forward and rearward (longitudinal) direction of the airplane model 1, a vertical force in a vertical direction, and a lateral force in a rightward and leftward direction. The detected moments are a rolling moment around an axis in the forward and rearward direction, a yawing moment around an axis in the vertical direction, and a pitching moment around an axis in the rightward and leftward direction.

Figure 2:
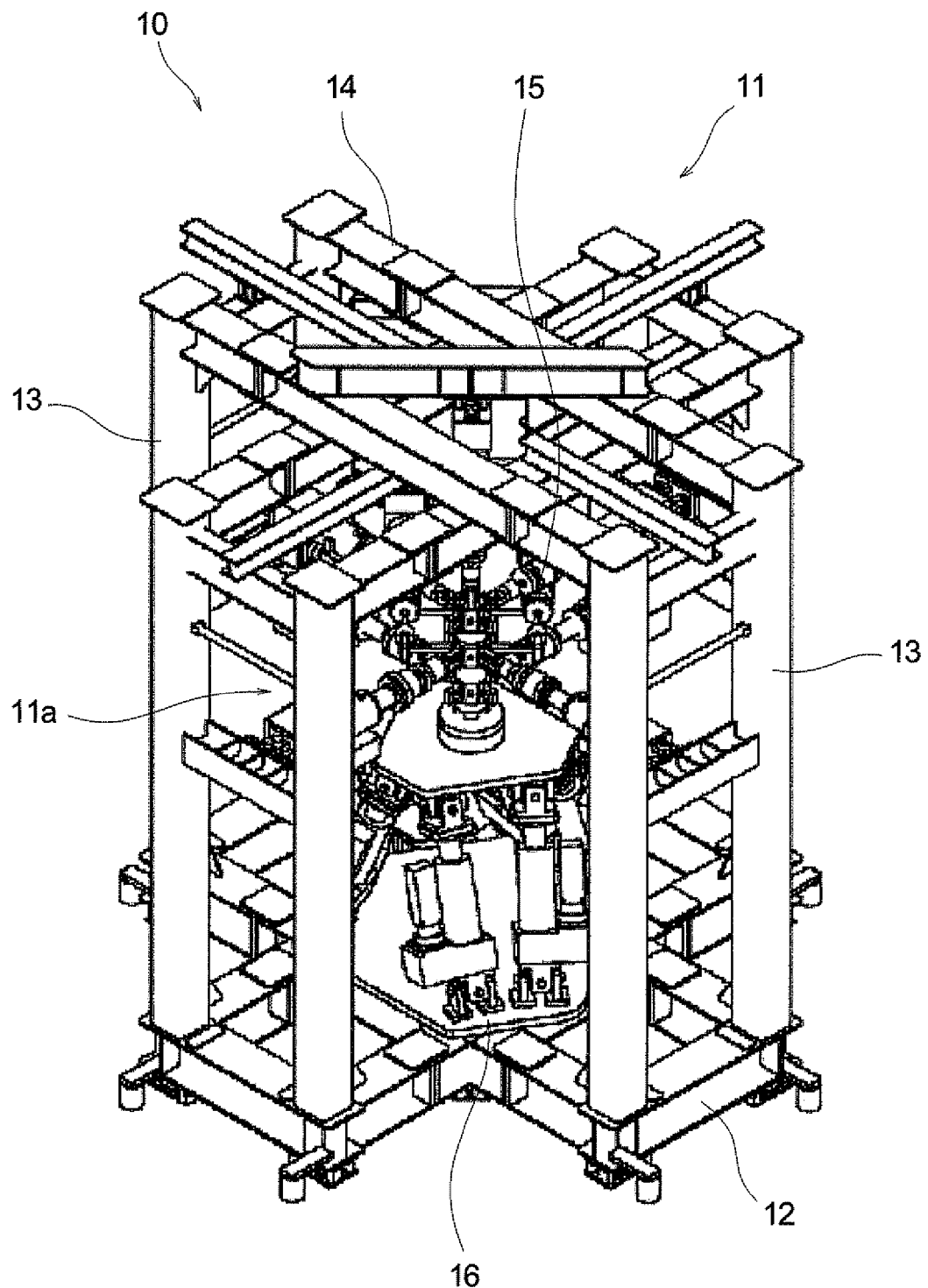
FIG. 2 is a perspective view showing a wind tunnel balance calibrator according to an embodiment of the present invention, to calibrate a wind tunnel balance of FIG. 1.
Figure 3:
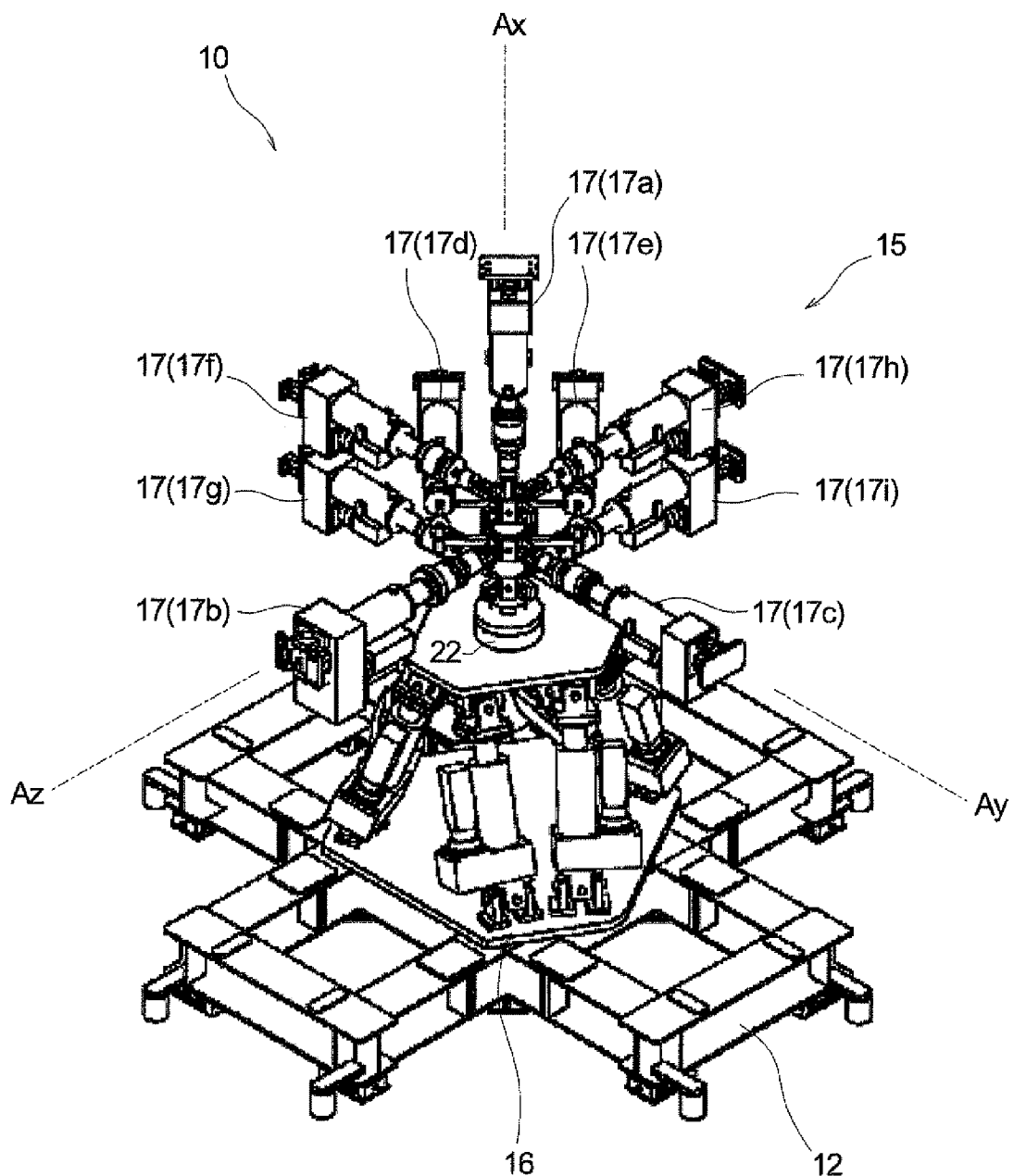
FIG. 3 is a perspective view showing a configuration of the wind tunnel balance calibrator of FIG. 2, in a state where frames assembled outside the wind tunnel balance calibrator are omitted.

FIG. 2 is a perspective view showing a wind tunnel balance calibrator 10 according to the embodiment of the present invention, to calibrate the wind tunnel balance 2 configured as described above. FIG. 3 is a perspective view showing a configuration of the wind tunnel balance calibrator 10 of FIG. 2, in a state where frames assembled outside the wind tunnel balance calibrator 10 are omitted. As shown in FIG. 2, the wind tunnel balance calibrator 10 includes a load application mechanism 15 for applying a calibration load to the wind tunnel balance 2, and an attitude restoration mechanism 16 for restoring the attitude of the wind tunnel balance 2 having been displaced by applying the calibrating load to the wind tunnel balance 2, within an accommodating frame assembly 11 formed by assembling frame members in a basket shape. The accommodating frame assembly 11 includes a base frame 12 installed on the ground and having a shape in which two steel-made rectangular frame members opening in an upward and downward direction (vertical direction) are arranged to cross each other at a right angle, columnar frames 13 extending vertically upward from corner portions of the rectangular frame members, respectively, and an upper frame 14 provided between and coupled to the upper end portions of the columnar frames 13 facing each other. The base frame 12, the columnar frames 13, and the upper frame 14 define an internal space 11a for accommodating the load application mechanism 15 and the attitude restoration mechanism 16.

As shown in FIG. 3, the attitude restoration mechanism 16 is disposed at the center portion of the base frame 12, in the internal space 11a. In the present embodiment, as described later in detail, a parallel-link mechanism is used as the attitude restoration mechanism 16. The attitude restoration mechanism 16 supports the wind tunnel balance 2. The load application mechanism 15 includes a plurality of actuators 17 constituted by linear electric cylinders or the like. The base end portion of each actuator 17 is supported in a suitable position of the accommodating frame assembly 11. The actuator 17 is not limited to an actuator constituted by an electric cylinder but may be, for example, a hydraulic actuator.

Hereinafter, a detailed description will be given of specific configuration, layout and the like, of components of the wind tunnel balance calibrator 10 including the load application mechanism 15 and the attitude restoration mechanism 16.

Figure 4:
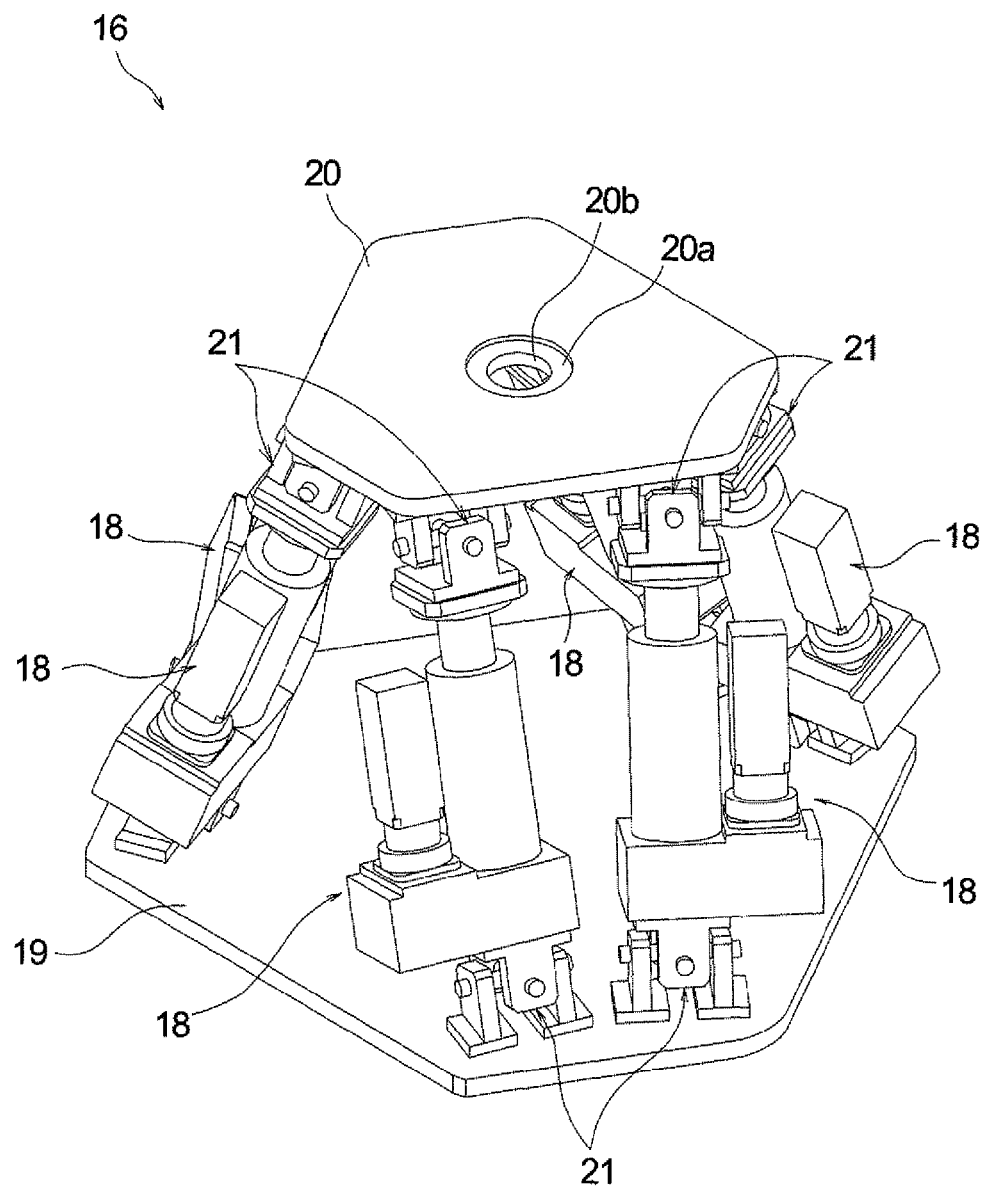
FIG. 4 is a perspective view showing an attitude restoration mechanism.

FIG. 4 is a perspective view showing the attitude restoration mechanism 16. As shown in FIG. 4, the attitude restoration mechanism 16 includes six linear actuators (driving unit) 18 arranged in a standing position, a base plate 19 of a substantially hexagonal shape, and a support plate 20 having a substantially hexagonal shape and being smaller in size than the base plate 19. The base end portions (lower end portions) of the actuators 18 are coupled to the upper surfaces of the corner portions of the base plate 19, via universal joints 21, respectively. The tip end portions (upper end portions) of the actuators 18 are coupled to the lower surfaces of the corner portions of the support plate 20, via universal joints 21, respectively. The actuators 18 are constituted by electric cylinders incorporating ball splines, respectively.

The attitude restoration mechanism 16 configured as described above constitutes a parallel-link mechanism, in which the six actuators 18 are selectively extended and contracted to allow the support plate 20 to be displaced with respect to the base plate 19 with six degrees of freedom. Since the attitude restoration mechanism 16 is configured to support the support plate 20 by the six actuators 18, the support plate 20 can ensure a high stiffness (i.e., high attitude maintaining ability).

The support plate 20 has a recess 20a having a circular profile in a center portion thereof when viewed from above. In a center position of the recess 20a, a through-hole 20b is formed. A support metal member 22 is internally fitted into and secured to the recess 20a. The wind tunnel balance 2 is coupled to the support metal member 22. Therefore, when the support plate 20 is in a horizontal position as an initial state, the wind tunnel balance 2 is supported on the support plate 20 via the support metal member 22 with its center axis oriented in the vertical direction (see FIG. 3). Electric wires (not shown) drawn from the wind tunnel balance 2 are inserted into the through-hole 20b. Signals output from the strain gauges (not shown) of the wind tunnel balance 2 can be transmitted to outside through the electric wires. The wind tunnel balance 2 supported on the support plate 20 of the attitude restoration mechanism 16 in this way is inserted into a tubular calibration body 25 coupled to the load application mechanism 15 to receive the calibration loads generated in the load application mechanism 15.

The attitude restoration mechanism 16 is not limited to the parallel-link mechanism constituted by the electric cylinders. For example, other mechanism may be used so long as it includes a driving unit capable of displacing the attitude of a support unit for supporting the wind tunnel balance 2 like the support plate 20 with six degrees of freedom in axial directions of three orthogonal axes and around the three orthogonal axes, and is configured to support the wind tunnel balance 2 at one side of the support unit and dispose the driving unit at an opposite side of the support unit.

Figure 5:
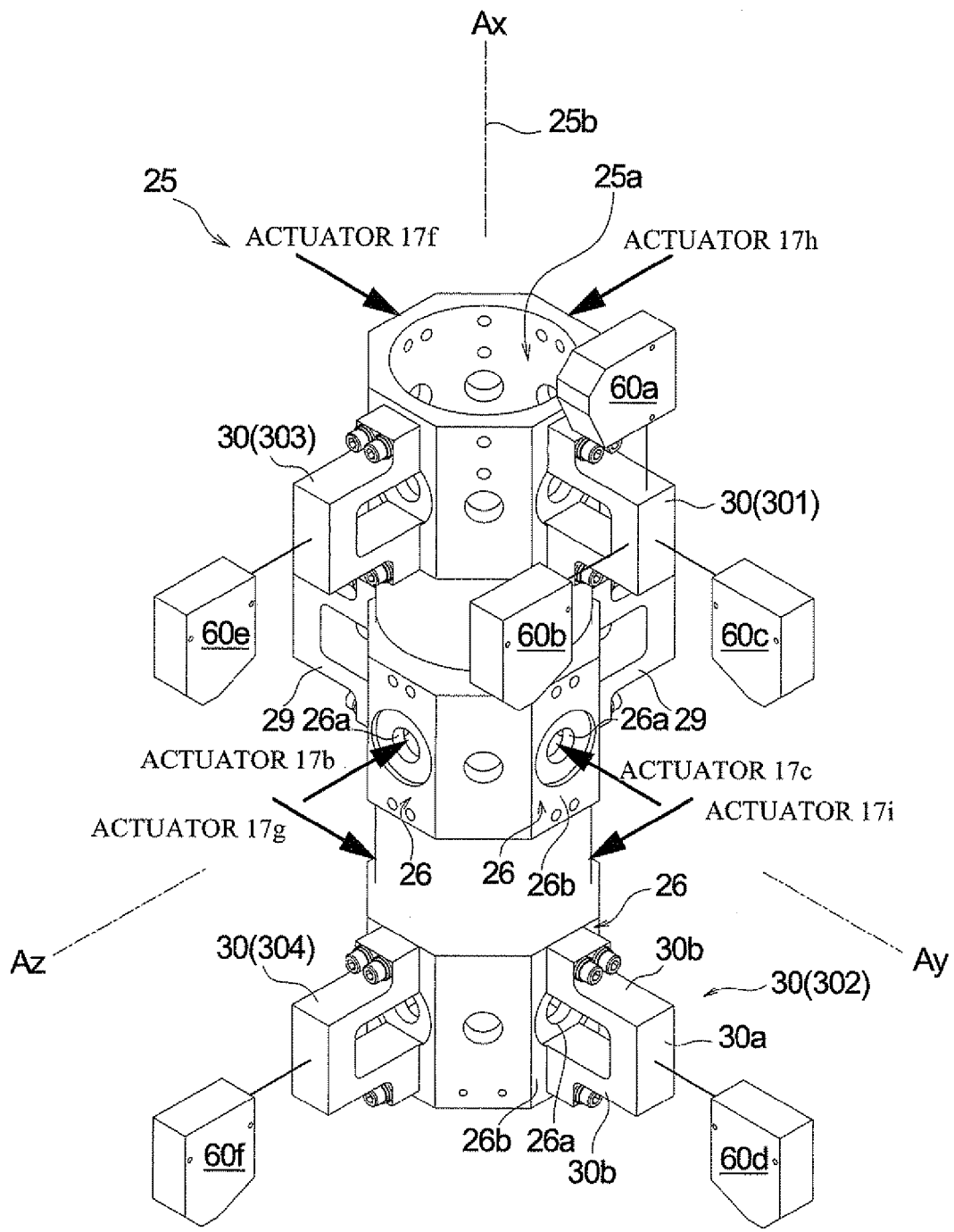
FIG. 5 is a perspective view showing a calibration body, and a configuration of the calibration body of FIG. 3 when viewed from rearward and from obliquely above.

FIG. 5 is a perspective view showing the calibration body 25, and showing the configuration of the calibration body 25 in the same direction as the direction shown in FIG. 3. As shown in FIG. 5, the calibration body 25 has a cylindrical shape which is elongated in a center axis direction. The wind tunnel balance 2 is inserted into and fixed to an internal space 25a of the calibration body 25 placed such that its lengthwise direction conforms to the vertical direction. The calibration body 25 has metal member connecting mechanisms 26 at three locations which are a lower portion, a center portion, and an upper portion. These metal member connecting mechanisms 26 have on their peripheral surfaces, eight metal member connecting surfaces 26b, respectively, which are arranged in a circumferential direction, are flat and have a rectangular shape. The metal member connecting surfaces 26b have through-holes 26a for providing communication between inside of the calibration body 25 and outside of the calibration body 25. When the metal member connecting mechanisms 26 are viewed from above, their profiles form a substantially octagon shape. Therefore, a metal member connecting surface 26b facing a particular metal member connecting surface 26b is parallel to the particular metal member connecting surface 26b, while a metal member connecting surface 26b which is located apart from the particular metal member connecting surface 26b such that one metal member connecting surface 26b is interposed between them is perpendicular to the particular metal member connecting surface 26b. The normal lines passing through the centers of the respective metal member connecting surfaces 26b are orthogonal to the center axis 25b of the calibration body 25. A portion between adjacent upper and lower metal member connecting mechanisms 26 has a cylindrical shape in which its peripheral surface is a curved surface and its outer diameter is smaller than that of the metal member connecting mechanism 26.

Each of the metal member connecting surfaces 26b is attached with a balance metal member 29 for maintaining a weight balance of the calibration body 25, a measurement target metal member 30 which is a measurement target of a laser displacement meter 60 as described later, and a first load transmission metal member 31a (see FIG. 6) connected with the corresponding actuator 17. The measurement target metal member 30 has a gate shape in which leg elements 30b respectively extend from both ends of a beam element 30a of a rectangular column shape. The tip ends of the leg elements 30b are fastened to upper and lower portions of the metal member connecting surface 26b such that the through-hole 26a is sandwiched between the leg elements 30b. The measurement target metal members 30 are connected to the calibration body 25 to extend radially, around the center axis 25b. Like the measurement target metal member 30, each of the balance metal member 29 and the first load transmission metal member 31a has the beam element 30a and the leg elements 30b forming a gate shape.

Figure 6:
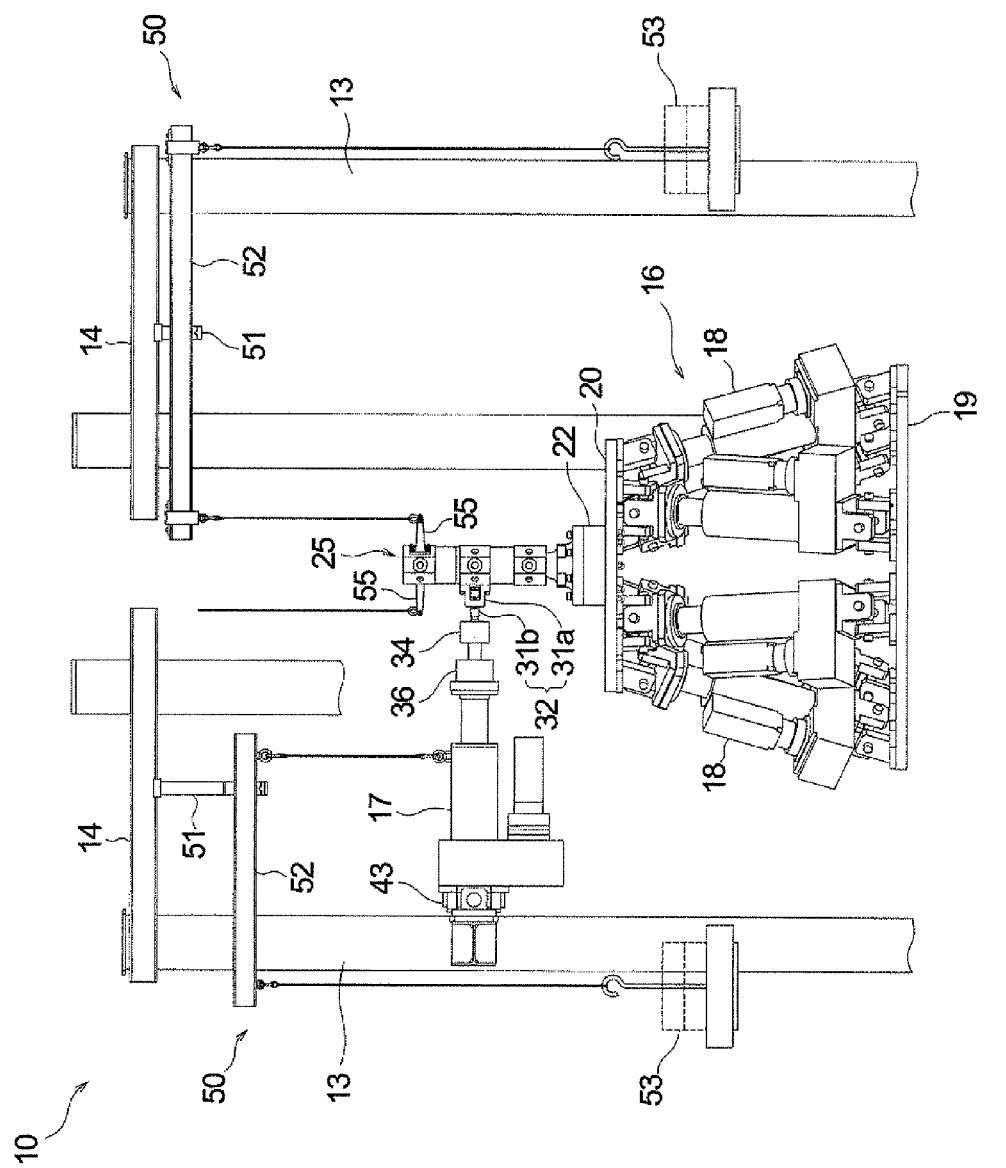
FIG. 6 is a front view showing a state where the calibration body is coupled to one of actuators in a load application mechanism via metal members, and another actuators in the load application mechanism are omitted.

FIG. 6 is a front view showing a state where the calibration body 25 is coupled to one of the actuators 17 in the load application mechanism 15 via the first load transmission member 31a, and another actuators 17 in the load application mechanism 15 are omitted. As shown in FIG. 6, the calibration body 25 is coupled with the actuator 17 via a second load transmission metal member 31b, a load cell 34, and a buffering mechanism 36, in addition to the first load transmission metal member 31a. To be greater detailed, the second load transmission metal member 31b has a rectangular frame shape having a substantial thickness and is wound around the beam element 30a of the first load transmission metal member 31a. Note that the first load transmission metal member 31a and the second load transmission member 31b constitute a push-pull metal member 32, and are configured to transmit to the calibration body 25, a calibration load generated by the actuator 17 toward the center axis 25b in a radially inward direction, and a calibration load generated by the actuator 17 away from the center axis 25b in a radially outward direction. The load cell 34 is connected to the second load transmission metal member 31b and is configured to detect a calibration load along the direction in which the first load transmission metal member 31a is mounted to the calibration body 25 (i.e., radially inward direction and radially outward direction around the center axis 25b).

Figure 7A:
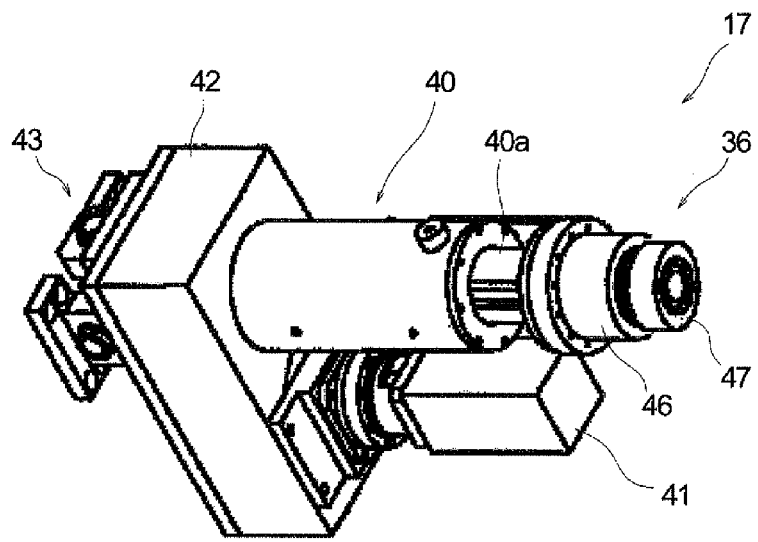
FIG. 7(a) is a perspective view and FIG. 7(b) is a cross-sectional view.
Figure 7B:
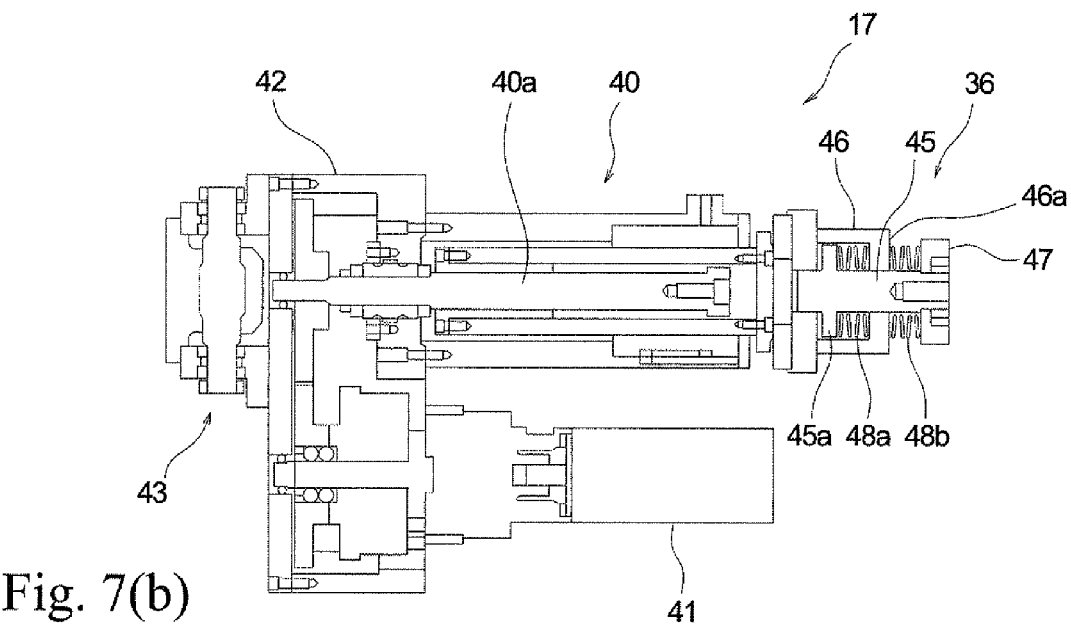

FIG. 7 is a view showing a configuration of the actuator 17 and the buffering mechanism 36, in which FIG. 7(a) is a perspective view and FIG. 7(b) is a cross-sectional view. As shown in FIG. 7(a), the actuator 17 has a cylindrical shape in its external appearance, and the buffering mechanism 36 has a cylindrical shape in its external appearance. The buffering mechanism 36 is coupled to the tip end of the actuator 17.

As shown in FIG. 7(b), in the present embodiment, the actuator 17 includes an electric cylinder 40 incorporating a ball spline, and a motor 41 for actuating the electric cylinder 40. The electric cylinder 40 and the motor 41 are coupled to a gear box 42 having a built-in mechanism for cooperating the electric cylinder 40 and the motor 41. The electric cylinder 40 has a spline shaft 40a which is slidable to be extended and retracted along a center axis thereof, according to the actuation of the motor 41. The buffering mechanism 36 is attached to the tip end of the spline shaft 40a.

The buffering mechanism 36 serves to buffer a load applied by the actuator 17 to the calibration body 25. The buffering mechanism 36 includes a plunger 45 and a cylinder 46 accommodating a part of the plunger 45. The cylinder 46 has a cylindrical shape, and has a through-hole in a center portion at one end portion 46a thereof. The plunger 45 extends over inside and outside of the cylinder 46 through the through-hole and has a flange portion 45a protruding radially outward at a base end portion inside the cylinder 46. A stopper 47 which is greater in outer diameter than the plunger 45 is mounted to the tip end portion of the plunger 45 which is outside the cylinder 46. Inside the cylinder 46, a first buffering means 48a is accommodated between the inner surface of one end portion 46a and the flange portion 45a of the plunger 45, and a second buffering means 48b is provided between the outer surface of one end portion 46a and the stopper 47. In the present embodiment, each of the buffering means 48a and 48b is configured to include circularly annular disc springs superposed in a suitable number, and the plunger 45 is inserted into a center hole of the buffering means 48a and a center hole of the buffering means 48b.

The buffering mechanism 36 configured as described above prevents an excess calibration load from being applied by the actuator 17 to the calibration body 25. When the electric cylinder 40 is extended to apply a pressing load, the first buffering means 48a is compressed to prevent a rapid great pressing load from being applied to the calibration body 25. When the electric cylinder 40 is retracted to apply a pulling load, the second buffering means 48b is compressed to prevent a rapid great pulling load from being applied to the calibration body 25. Further, the calibration body 25 responds to the load generated by the actuator 17 relatively slowly. For example, the calibration body 25 is configured not to respond to an abrupt load. This makes it possible to easily control the operation of the actuator 17 when the actuator 17 is increasing the load up to a target value.

As shown in FIG. 6, the above stated actuator 17 is coupled to the accommodating frame assembly 11 in a suitable location via a universal joint 43 (see FIG. 7(a)) attached to the gear box 42. A weight cancel mechanism 50 prevents the weight of the actuator 17 from being applied to the calibration body 25. The weight cancel mechanism 50 is a balance device utilizing a "lever" in the present embodiment. The weight cancel mechanism 50 includes a support member 51 extending vertically downward from an upper frame 14 of the accommodating frame assembly 11 and an arm member 52 having a fulcrum point supported by the support member 51. The actuator 17 is suspended by a wire extending vertically downward (hanging) from one end (action point) of the arm member 52, and a weight 53 is suspended by a wire extending downward (hanging) from an opposite end (effort point). Therefore, by suitably adjusting the position of the fulcrum point and/or mass of the weight 53, a moment at the effort point and a moment at the action point around the fulcrum point are balanced so that a force which is equal in weight to the actuator 17 and is oriented in a direction opposite to gravity of the actuator 17 is applied to the actuator 17.

As shown in FIG. 6, the calibration body 25 is coupled with the weight cancel mechanisms 50 having the same configuration. To be specific, weight support arms 55 extending radially outward are coupled to two metal member connecting surfaces 26b disposed to face each other with the center axis 25b interposed therebetween, in the metal member connecting mechanisms 26 which are provided at the upper portion of the calibration body 25. The tip ends of these weight support arms 55 are coupled to the lower end portions of the wires extending vertically downward (hanging) from one ends (action points) of the arm members 52, respectively. Weights 53 are suspended from the opposite ends (effort points) of the arm members 52 by wires, respectively. The arm members 52 are supported by the support members 51 extending vertically downward from the upper frame 14 of the accommodating frame assembly 11, respectively. Although only the weight cancel mechanism 50 coupled to one of the weight support arms 55 is depicted in FIG. 6, the weight cancel mechanism 50 having a similar configuration is coupled to the other weight support arm 55.

Figure 8:
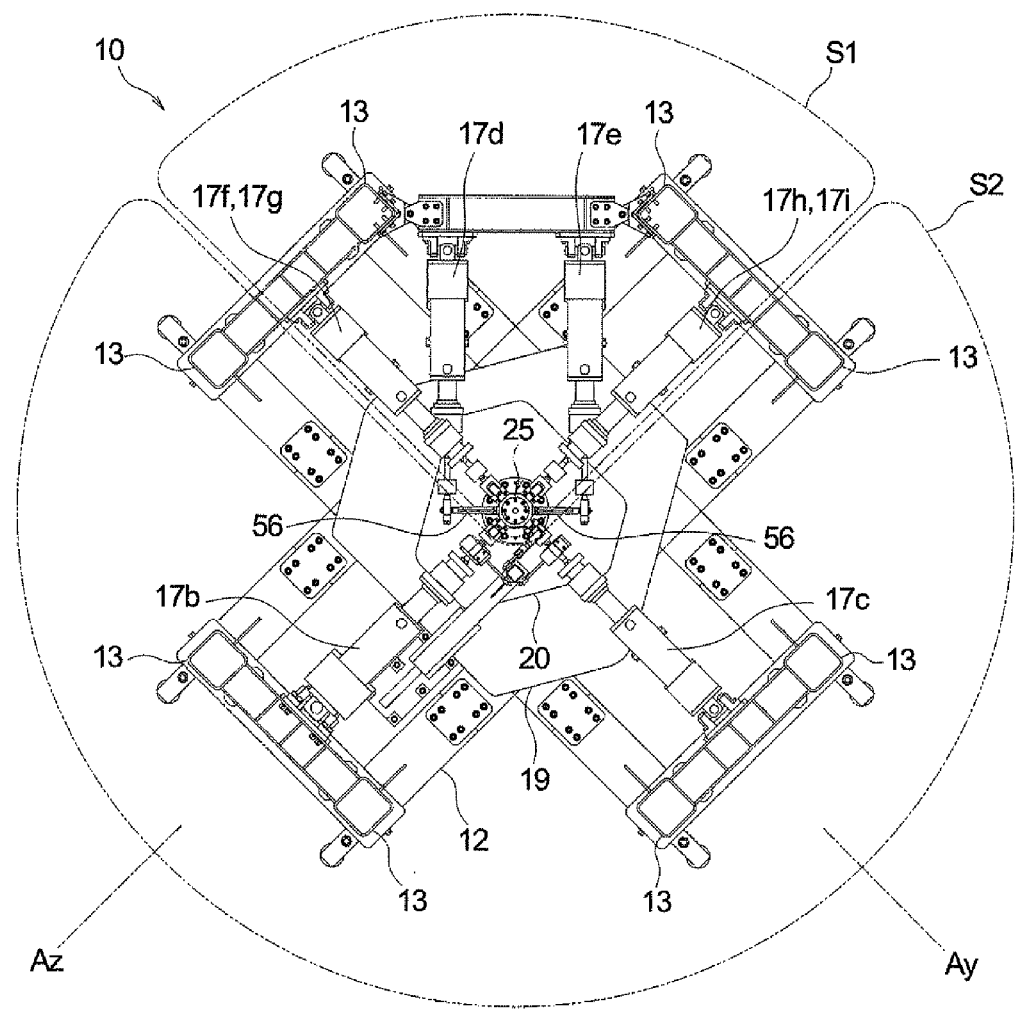
FIG. 8 is a plan view of the wind tunnel balance calibrator of FIG. 3, showing a layout of the actuators constituting the above load application mechanism.

FIG. 8 is a plan view of the wind tunnel balance calibrator 10 of FIG. 3, showing the layout of the actuators 17 constituting the load application mechanism 15. As shown in FIG. 8, in the present embodiment, the load application mechanism 15 includes nine actuators 17 in total. Among these actuators 17, three actuators 17 are first actuators 17a~17c each of which applies to the wind tunnel balance 2 (i.e., calibration body 25) a calibration load parallel to each of axial directions of X-axis Ax, Y-axis Ay, and Z-axis Az (see FIGS. 8 and 3) which are three axes orthogonal to each other within the wind tunnel balance 2, while the remaining six actuators 17 are second actuators (moment actuators) 17d~17i each of which applies a moment around each axis to the wind tunnel balance 2.

In greater detail, as shown in FIG. 3, the three axes orthogonal to each other in a predetermined position within the wind tunnel balance 2 are set in the wind tunnel balance calibrator 10. These axes are the X-axis Ax oriented in the vertical direction conforming to the center axis of the wind tunnel balance 2, the Y-axis Ay orthogonal (perpendicular) to the X-axis Ax, and the Z-axis Az orthogonal (perpendicular) to the X-axis Ax, the Y-axis Ay and the Z-axis Az being orthogonal to each other. The first actuator 17a extends vertically downward from the upper frame 14 and is coupled to the upper portion of the calibration body 25. The first actuator 17a is configured to apply a calibration load to the calibration body 25 in a vertical direction along the X-axis Ax. The first actuators 17b and 17c are coupled to the metal member connecting mechanism 26, respectively, which are provided at the vertical center portion of the calibration body 25 in a state where the first actuators 17b and 17c are supported on columnar frames 13, respectively, and are suspended from the weight cancel mechanisms 50, respectively. As shown in FIG. 8, the first actuator 17b is configured to apply a calibration load to the calibration body 25 in a horizontal direction along the Z-axis Az, and the first actuator 17c is configured to apply a calibration load to the calibration body 25 in a horizontal direction along the Y-axis Ay.

In contrast, among the second actuators 17d~17i, each of the second actuators 17d and 17e is configured to generate a moment around the X-axis Ax, each of the second actuators 17f and 17g is configured to generate a moment around the Z-axis Az, and each of the second actuators 17h and 17i is configured to generate a moment around the Y-axis Ay. The second actuators 17d~17i are supported in suitable locations of the columnar frames 13, respectively, and are suspended from the weight cancel mechanisms 50, respectively.

The second actuators 17f and 17g corresponding to the Z-axis Az are arranged in parallel in the upward and downward (vertical direction) and are on an opposite side of the first actuator 17c with the calibration body 25 interposed between them. The upper second actuator 17f is coupled to the metal member connecting mechanism 26 provided at the upper portion of the calibration body 25, while the lower second actuator 17g is coupled to the metal member connecting mechanism 26 provided at the lower portion of the calibration body 25 (see bold arrows in FIG. 5). By extending one of the second actuators 17f and 17g and retracting the other, the moment around the Z-axis Az is applied to the wind tunnel balance 2 (i.e., calibration body 25).

The second actuators 17h and 17i corresponding to the Y-axis Ay are arranged in parallel in the upward and downward (vertical direction) and are on an opposite side of the first actuator 17b with the calibration body 25 interposed between them. The upper second actuator 17h is coupled to the metal member connecting mechanism 26 provided at the upper portion of the calibration body 25, while the lower second actuator 17i is coupled to the metal member connecting mechanism 26 provided at the lower portion of the calibration body 25 (see bold arrows in FIG. 5). By extending one of the second actuators 17h and 17i and retracting the other, the moment around the Y-axis Ay is applied to the wind tunnel balance 2 (i.e., calibration body 25).

The second actuators 17d and 17e corresponding to the X-axis Ax are arranged in parallel in a rightward and leftward direction, and are positioned in a small space S1 between the second actuators 17f and 17g, and the second actuators 17h and 17i. In other words, as shown in FIG. 8, when viewed from above, the second actuators 17f and 17g and the second actuators 17h and 17i which are arranged such that the second actuators 17f and 17g are orthogonal to the second actuators 17h and 17i separate a space around the calibration body 25 into the narrow space S1 (see an area defined by a two-dotted line) corresponding to one quadrant, and a wide space (sparse space) S2 corresponding to the remaining three quadrants. The second actuators 17d and 17e are positioned in the narrow space S1.

Two load transfer arms 56 are attached to the metal member connecting mechanisms 26 provided at the vertical center portion of the calibration body 25, respectively. The load transfer arms 56 extend radially outward around the center axis 25b of the calibration body 25, from the two metal member connecting surfaces 26b placed to face each other with the center axis 25b interposed between them. The second actuators 17d and 17e are coupled to the tip end portions of the load transfer arms 56, respectively. By extending one of the second actuators 17d and 17e and retracting the other, the moment around the X-axis Ax is applied to the wind tunnel balance 2 (i.e., calibration body 25).

As described above, in the load application mechanism 15 according to the present embodiment, the six second actuators 17d~17i are positioned in the space S1 corresponding to one quadrant when viewed from above, while only the two first actuators 17b and 17c are positioned in the space S2 corresponding to the remaining three quadrants when viewed from above. In addition, the attitude restoration mechanism 16 supports the wind tunnel balance 2 at the upper side of the support plate 20, while the actuators 18 constituting the driving unit in the attitude restoration mechanism 16 are disposed only under the support plate 20. This makes it possible to ensure the wide space S2 in the vicinity of the calibration body 25 which is not obstructed by the second actuators 17d~17i in the load application mechanism 15 and the actuators 18 in the attitude restoration mechanism 16. As a result, a maintenance work can be easily carried out.

Note that the layout of the actuators 17 is not limited to that (position, number, etc.) depicted in FIG. 8. Another layout may be used so long as a sparse space which allows the maintenance work to be carried out easily can be ensured. By comparison of the configuration depicted in FIG. 8, the second actuators 17d and 17e for generating the moment around the X-axis Ax may be positioned between the first actuator 17c and the second actuators 17h and 17i when viewed from above, or between the first actuator 17b and the second actuator 17f and 17g when viewed from above. In the former case, there is formed a sparse space in which only the first actuator 17b is substantially disposed within two quadrants. In the latter case, there is formed a sparse space in which only the first actuator 17c is substantially disposed within two quadrants.

As shown in FIG. 5, the wind tunnel balance calibrator 10 includes six laser displacement meters 60a~60f to detect a correct position (or displacement) of the calibration body 25. In the present embodiment, three laser displacement meters 60a~60c are provided to correspond to a measurement target metal member 30 (301) coupled to the metal member connecting surface 26b located on an opposite side of the second actuator 17f with respect to the center axis of the calibration body. The laser displacement meters 60d, 60e and 60f are provided to respectively correspond to measurement target metal members 30 (302~304) coupled to the metal member connecting surfaces 26b which are located on an opposite side of the second actuators 17g, 17h and 17i, respectively.

Among these, for the measurement target metal member 30 (301) located on an opposite side of the second actuator 17f, the laser displacement meter 60a is disposed to face the upper surface of the upper leg element 30b, i.e., surface orthogonal to the X-axis Ax, the laser displacement meter 60b is disposed to face the surface of the beam element 30a which is orthogonal to the Z-axis Az, and the laser displacement meter 60c is disposed to face the surface of the beam element 30a which is orthogonal to the Y-axis Ay.

For the measurement target metal member 302 located on an opposite side of the second actuator 17g, the laser displacement meter 60d is disposed to face the surface of the beam element 30a which is orthogonal to the Y-axis Ay. That is, like the above stated laser displacement meter 60e disposed to correspond to the upper measurement target metal member 301, the laser displacement meter 60d is disposed to correspond to the lower measurement target metal member 302. The upper and lower laser displacement meters 60c and 60d are capable of detecting a rotational displacement around the Z-axis Az of the calibration body 25.

For the measurement target metal members 303 and 304 located on an opposite side of the second actuators 17h and 17i, respectively, the laser displacement meters 60e and 60f are provided to face the surfaces of the beam elements 30a, respectively, which surfaces are orthogonal to the Z-axis Az. The upper and lower laser displacement meters 60e and 60f are capable of detecting a rotational displacement around the Y-axis Ay of the calibration body 25.

A displacement along the Y-axis Ay can be detected based on an average value of the outputs of the laser displacement meters 60c and 60d, among the above stated laser displacement meters 60a~60f. A displacement along the Z-axis Az can be detected based on an average value of the outputs of the laser displacement meters 60e and 60f, among the above stated laser displacement meters 60a~60f. The laser displacement meter 60a is capable of detecting a displacement along the X-axis Ax.

The laser displacement meters 60b and 60e are capable of detecting a rotational displacement around the X-axis Ax of the calibration body 25. To be specific, for example, if a displacement is detected only by the laser displacement meter 60b (or when a displacement amount detected by the laser displacement meter 60e is much smaller than a displacement amount detected by the laser displacement meter 60b), of the laser displacement meters 60b and 60e, it is determined that the calibration body 25 has been rotated around the X-axis Ax. If a displacement in the same direction and with the same dimension is detected by both of the laser displacement meters 60b and 60e, it is determined that the calibration body 25 has been displaced around the Z-axis Az direction.

As described above, in the wind tunnel balance calibrator 10 of the present embodiment, the six laser displacement meters 60a~60f are capable of detecting displacements of six degrees of freedom of the calibration body 25 (i.e., wind tunnel balance 2).

Figure 9:
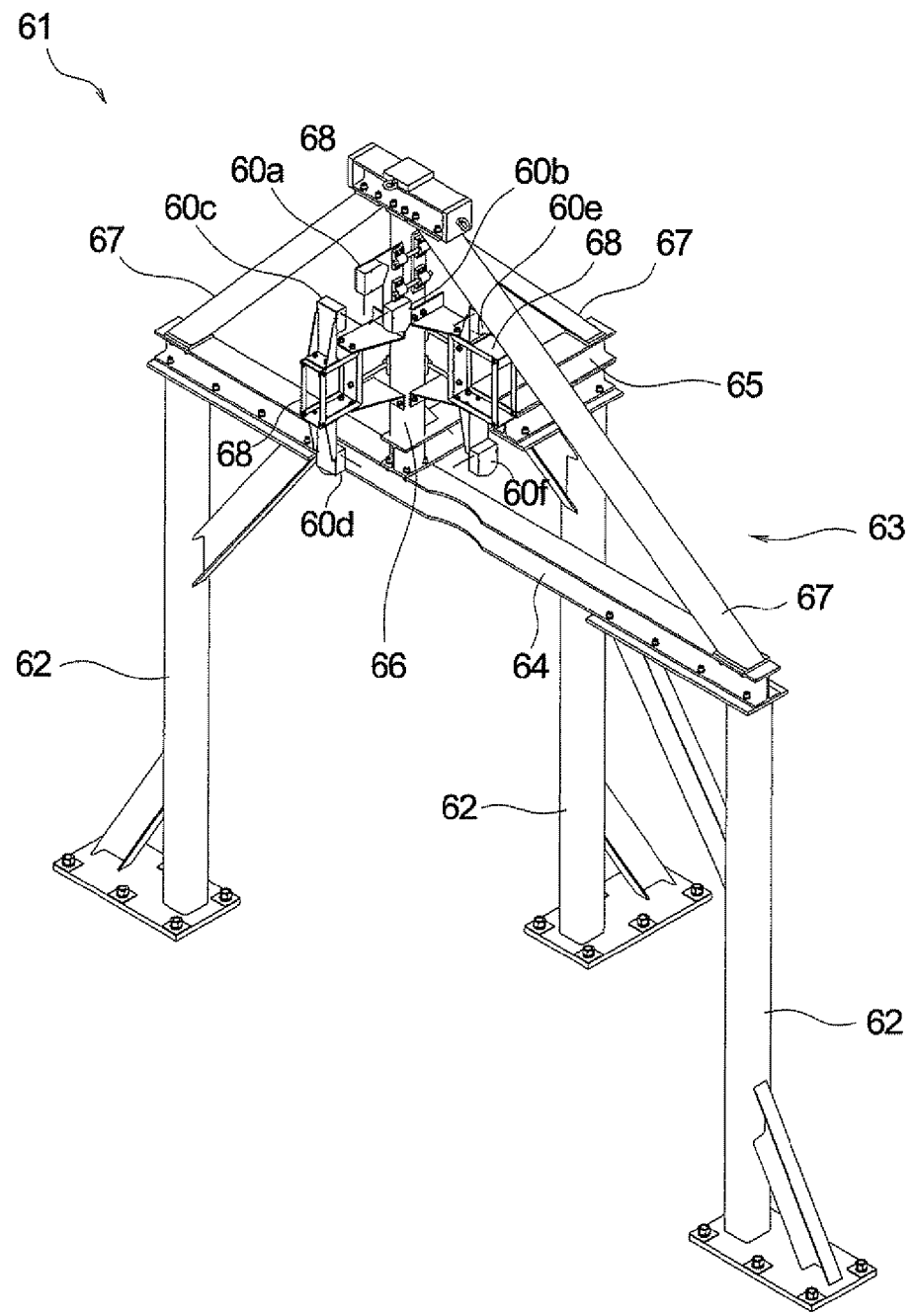
FIG. 9 is a perspective view showing a support structure of laser displacement meters.

FIG. 9 is a perspective view showing a support structure of the laser displacement meters 60a~60f. As shown in FIG. 9, all of the laser displacement meters 60a~60f are supported on a sensor support frame 61 installed on the ground separately from the accommodating frame assembly 11 shown in FIG. 1. The sensor support frame 61 has a structure in which a truss structure 63 is provided on the upper portions of three support columns 62 having lower end portions secured to the ground. The truss structure 63 includes a first bridge member 64 provided between and coupled to the two support columns 62, a second bridge member 65 provided between and coupled to the upper portion of the remaining one support column 62 and the first bridge member 64, a support plate 66 extending upward from a portion at which the bridge members 64 and 65 are coupled together, and three inclined columns 67 extending from the upper portions of the support columns 62, respectively, to the upper end portion of the support plate 66. The laser displacement meters 60a~60f are attached to the support plate 66 via brackets 68 having a suitable shape.

Deformation or vibration attributed to the weights of the load application mechanism 15, the attitude restoration mechanism 16, and the weight cancel mechanism 50, or the motion of the actuators 17 and 18, will not occur in the sensor support frame 61 provided separately from the accommodating frame assembly 11. The support plate 66 built into the truss structure 63 is less easily displaced and has a high stiffness. Therefore, a fluctuation in the positions of the laser displacement meters 60a~60f can be suppressed significantly. As a result, a displacement of the calibration body 25 can be detected with higher accuracy.

Figure 10:
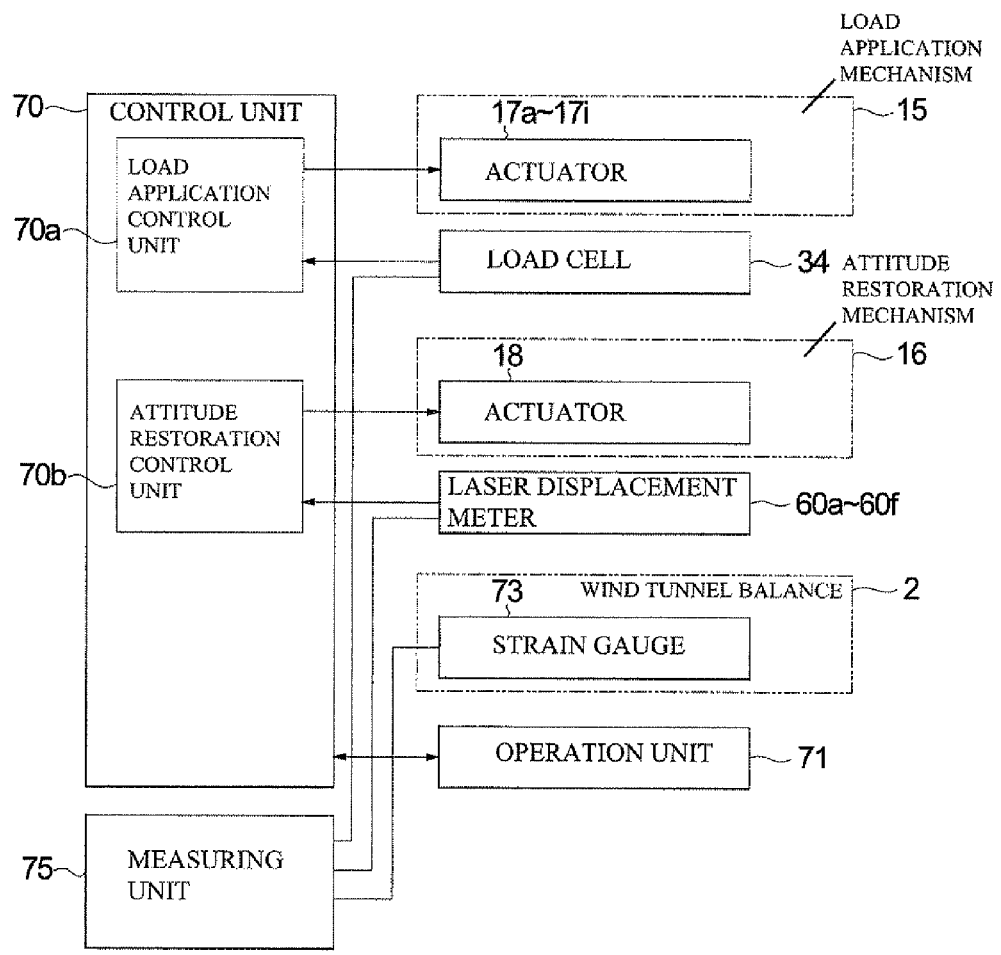
FIG. 10 is a block diagram showing a function of the wind tunnel balance calibrator.

FIG. 10 is a block diagram showing a function of the above described wind tunnel balance calibrator 10. As shown in FIG. 10, the wind tunnel balance calibrator 10 includes a control unit 70 constituted by a microprocessor, or the like, and an operation unit 71 constituted by a key board or a press button and connected to the control unit 70. The control unit 70 includes a load application control unit 70a for controlling the operation of the load application mechanism 15, and an attitude restoration control unit 70b for controlling the operation of the attitude restoration mechanism 16. Preferably, the load application control unit 70a and the attitude restoration control unit 70b are constituted by devices independent of each other. Since the devices are provided separately according to the function, the system can operate stably.

The load application control unit 70a is coupled with the actuators 17a~17i in the load application mechanism 15 and the load cells 34 as described above. The attitude restoration control unit 70b is coupled with the actuators 18 in the attitude restoration mechanism 16 and the laser displacement meters 60a~60f. The wind tunnel balance calibrator 10 includes a measuring unit 75 for conducting measurement separately from the control unit 70. The load cells 34, the laser displacement meters 60a~60f, and the strain gauges 73 attached on the wind tunnel balance 2 are coupled to the measuring unit 75.

Figure 11:
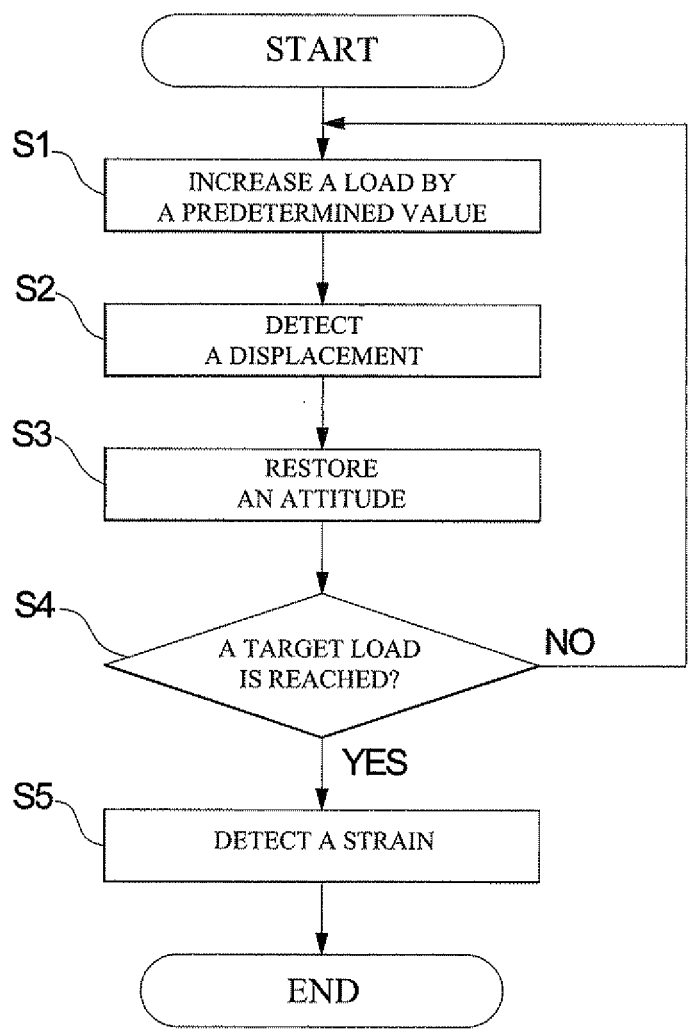
FIG. 11 is a flowchart showing an example of the operation of the wind tunnel balance calibrator which occurs when a load applied to the wind tunnel balance is increased until a target value of the load is reached.

The wind tunnel balance calibrator 10 starts to operate to calibrate the wind tunnel balance 2 by the operator's operation of the operation unit 71 and/or according to a predetermined program. FIG. 11 is a flowchart showing an example of the operation of the wind tunnel balance calibrator 10 which occurs when a load applied to the wind tunnel balance 2 is increased until a target value of the load is reached. As shown in FIG. 11, in the wind tunnel balance calibrator 10, the load application mechanism 15 is actuated to apply a calibration load to the wind tunnel balance 2. At this time, the load to be applied to the wind tunnel balance 2 is increased by a predetermined value so that the load is increased gradually so as not to change the attitude of the calibration body 25 to a great level until a final target value of the calibration load is reached (S1). After that, a displacement generated in the attitude of the calibration body 25 by the load applied newly in step 1 is detected based on the detected values from the laser displacement meters 60a~60f (S2). Based on the displacement, the attitude restoration mechanism 16 restores the attitude of the calibration body 25 (S3). The attitude of the calibration body 25 is restored so that the attitude of the calibration body 25 with respect to each of the actuators 17 at an application point of the calibration load is maintained in an initial state with predetermined accuracy.

Then, when the restoration of the attitude in step 3 finishes, it is determined whether or not the applied load has reached a preset target value based on the detected value from each of the load cells 34 (S4). If it is determined that the applied load has not reached the preset target value (S4: NO), the operation from step S1 is performed again, and increasing of the load by the predetermined value (S1), detection of the displacement (S2), and restoration of the attitude (S3) are repeated, until the target value is reached. On the other hand, if it is determined that the applied load has reached the preset target value (S4: YES), the detected signal is obtained from each of the strain gauges 73 of the wind tunnel balance 2, in a state where the relative attitude (position) between the calibration load vector and the calibration body 25 is maintained. This makes it possible to correctly detect an apparent strain of the wind tunnel balance 2 in addition to a normal strain generated in the wind tunnel balance 2, when the predetermined calibration load is applied to the wind tunnel balance 2 (S5).

When the load is being increased up to the target value, feedback control is executed based on the detected value of each of the load cells 34 so that a proper load is applied to the calibration body 25. Each of the buffering mechanisms 36 serves to suppress an excess load based on the calibration load from being applied to the calibration body 25. The value of the load to be increased in step 1 can be suitably determined under the condition in which an excess load is not applied to the calibration body 25 in view of the operation characteristic of each of the actuators 17 and the buffering capability of each of the buffering mechanisms 36. The value of the load to be increased in one step is preferably less to suppress an influence caused by frictions and the operation of each of the actuators 17, etc., when the attitude is being restored and is preferably great to finish a calibration process earlier.

To ensure a proper operation of the wind tunnel balance calibrator 10, the following process is preferably performed. By repeating the operation in steps 1~3, the attitude of the calibration body 25 is substantially maintained for a time period which passes until the load reaches the target value. If the attitude of the calibration body 25 is displaced by a predetermined amount or greater before the load reaches the target value, a process for stopping the load application mechanism 15 and the attitude restoration mechanism 16 is performed. This process may be performed as an interruption process with respect to a routine of FIG. 11, at a time point when the displacement of the predetermined amount or greater is detected.

In a case where the load is applied to the calibration body 25, using only a part of the actuators 17 without using the other actuators 17, the load cells 34 attached to the actuators 17 which are not active (actuators 17 which are not controlled targets) should indicate zero during a proper operation. Therefore, if a load of a predetermined value or greater is detected from the load cell 34 corresponding to any one of the actuators 17 which are not controlled targets, the process for stopping the load application mechanism 15 and the attitude restoration mechanism 16 is performed. This process may be performed as an interruption process with respect to the routine of FIG. 11, at a time point when the load of the predetermined amount or greater is detected. In this way, a relation between a load and a strain is measured and the characteristic of the wind tunnel balance 2 is detected, when calibration is performed. When the wind tunnel experiment is conducted, forces and moments generated in the airplane model which receives the wind pressure are calibrated based on the characteristic of the wind tunnel balance 2. As a result, an aerodynamic characteristic of the airplane mode can be detected correctly.

INDUSTRIAL APPLICABILITY

The present invention is applied to a wind tunnel balance calibrator capable of controlling the attitude of a wind tunnel balance with improved accuracy, and a wind tunnel balance calibrator capable of ensuring a wide work space in the vicinity of the wind tunnel balance.

REFERENCE SIGNS LISTS 1 airplane model
2 wind tunnel balance
10 wind tunnel balance calibrator
11 accommodating frame assembly
15 load application mechanism
16 attitude restoration mechanism
17 17a~17i actuator
18 actuator (driving unit)
25 calibration body
32 push-pull metal member
36 buffering mechanism
50 weight cancel mechanism
60a~60f laser displacement meter
70 control unit
70a load application control unit
70b attitude restoration control unit
Ax X-axis
Ay Y-axis
Az Z-axis
S1 space
S2 space (sparse space)

The invention claimed is:

1. A wind tunnel balance calibrator for measuring a strain of a wind tunnel balance which is generated by a load applied to the wind tunnel balance, said wind tunnel balance calibrator comprising:
   a load application mechanism for applying the load to the wind tunnel balance; and
   an attitude restoration mechanism for restoring an attitude of the wind tunnel balance which is displaced by the load applied to the wind tunnel balance;
   wherein the attitude restoration mechanism is a parallel-link mechanism including:
   a support unit for supporting the wind tunnel balance; and
   a driving unit which is configured to displace the attitude of the support unit with six degrees of freedom in directions of three orthogonal axes and around the three orthogonal axes, the driving unit including a plurality of linear actuators.

2. The wind tunnel balance calibrator according to claim 1, wherein the attitude restoration mechanism supports the wind tunnel balance at one side of the support unit;
   and wherein the driving unit is provided at an opposite side of the support unit.

3. The wind tunnel balance calibrator according to claim 1, wherein the load application mechanism includes a plurality of actuators disposed around the wind tunnel balance to apply the load to the wind tunnel balance;
   and wherein the plurality of actuators include moment actuators which are arranged in a predetermined area so as to form a sparse space in an area other than the predetermined area around the wind tunnel balance, the moment actuators being configured to generate moments around the three orthogonal axes crossing each other within the wind tunnel balance.

4. The wind tunnel balance calibrator according to claim 3, wherein the load application mechanism includes buffering mechanisms for buffering the load applied by the actuators to the wind tunnel balance.

5. The wind tunnel balance calibrator according to claim 3, comprising:
   weight cancel mechanisms for applying external forces for cancelling weights of the actuators, to the actuators in the load application mechanism, respectively.

6. The wind tunnel balance calibrator according to claim 3, comprising:
   a control unit for controlling operation of the load application mechanism and operation of the attitude restoration mechanism;
   wherein the control unit is configured to stop the load application mechanism and the attitude restoration mechanism if a predetermined load is generated in an actuator which is not a controlled target, in a state where the load is applied to the wind tunnel balance.

7. The wind tunnel balance calibrator according to claim 1, comprising:
   a control unit for controlling operation of the load application mechanism and operation of the attitude restoration mechanism;
   wherein the control unit is configured to change the load gradually while restoring the attitude of the wind tunnel balance, from when the load application mechanism starts to apply the load to the wind tunnel balance until a target value of the load is reached.

8. The wind tunnel balance calibrator according to claim 7, wherein the control unit is configured to stop the load application mechanism and the attitude restoration mechanism, when the attitude of the wind tunnel balance is displaced with a predetermined amount or greater.

9. The wind tunnel balance calibrator according to claim 1, comprising:
   an attitude detecting sensor for detecting the attitude of the wind tunnel balance;
   wherein the attitude detecting sensor and the load application mechanism are supported independently of each other using different support mechanisms.

10. A method of operating the wind tunnel balance calibrator as recited in claim 1, comprising the steps of:
    applying the load to the wind tunnel balance such that the load is changed by a predetermined value;
    restoring the attitude of the wind tunnel balance to a predetermined attitude after the load is changed by the predetermined value; and
    repeating the step of applying the load and the step of restoring the attitude to cause the load to reach a preset target value.

* * * * *